United States Patent [19]

Linse et al.

[11] Patent Number: 5,470,012
[45] Date of Patent: Nov. 28, 1995

[54] METHOD FOR FORMING SURFACES OF CONTINUOUS CASTING MOLDS

[75] Inventors: Vonne D. Linse, Columbus, Ohio; Bruce D. Horn, Johnstown, Pa.

[73] Assignee: Acutus Industries, Inc., Waterford, Mich.

[21] Appl. No.: 232,798

[22] Filed: Apr. 25, 1994

[51] Int. Cl.⁶ .................................................. B23K 20/08
[52] U.S. Cl. .......................... 228/107; 228/119; 164/418; 164/459
[58] Field of Search ..................... 228/107, 119; 164/459, 138, 418

[56] References Cited

U.S. PATENT DOCUMENTS 3,352,350  11/1967  Dore et al. .
3,735,476  5/1973  Deribas et al. ........................ 228/107

FOREIGN PATENT DOCUMENTS

| 0028805 | 5/1981 | European Pat. Off. | 228/119 |
| 1476181 | 4/1967 | France | 164/418 |
| 57-156882 | 9/1982 | Japan | 228/107 |
| 217928 | 10/1971 | U.S.S.R. | 228/107 |

*Primary Examiner*—Mark Rosenbaum
*Assistant Examiner*—Jeffrey T. Knapp
*Attorney, Agent, or Firm*—Dykema Gossett

[57] ABSTRACT

A method is available for forming a surface on a continuous casting mold. A surface of a continuous casting mold is formed by explosion cladding to produce a wear resistant surface having high bond strength. The surface may consist of a hot face of a broad or narrow wall of the continuous casting mold or may comprise the edges of the end walls. Deformation of the mold section is prevented by filling the coolant cavities with a filler prior to explosion cladding.

17 Claims, 2 Drawing Sheets

METHOD FOR FORMING SURFACES OF CONTINUOUS CASTING MOLDS

TECHNICAL FIELD OF THE INVENTION

The present invention relates generally to continuous casting molds, their manufacture, and their repair. More specifically, the present invention relates to welding techniques used to form the surfaces of continuous casting molds.

BACKGROUND OF THE INVENTION

A continuous casting mold has a pair of broad faces or side walls which are separated by a pair of narrow faces or end walls to form a box-shaped mold for casting a continuous steel slab. In the casting process, the molten metal is poured through the cavity defined by the inner surfaces of the mold walls. As the molten steel moves through the mold, it partially solidifies, forming an outer skin layer. In order to efficiently dissipate the heat from the molten steel, the walls of the mold are typically formed of copper or have a copper alloy surface layer and contain numerous passages through which water flows during the molding process for rapid heat exchange.

The surfaces of the mold which contact the molten steel, both broad faces and narrow faces are typically referred to as the "hot faces" of the mold. As stated, these faces are generally made of copper or copper alloys due to copper's excellent thermal conductivity characteristics. In continuous casting, however, these surfaces are exposed to the extremely-high temperature molten steel and flux for prolonged periods of time. Under these conditions, the hot faces of the mold experience relatively rapid degradation or wear such as cracking and erosion. Thus, it would be desirable to provide hot face surfaces which are more resistant to thermal wear than conventional continuous casting mold surfaces.

In addition, it is known that in order to adjust the width of the cast steel slab, continuous casting molds are designed to permit movement of the end walls along the length of the sidewalls. A fluid-tight joint must be maintained, however, between the edges of the end walls and the broad face surfaces which they contact. Typically, substantial clamping forces are exerted by the sidewalls on the edges of the end walls to achieve the required seal. To adjust the spacing of the end walls, the clamping force is released from one of the side walls which allows the position of the end walls to be adjusted.

It will be appreciated that as the end walls are adjusted to create various widths of steel slabs, the edges of the end walls become worn as a result of their movement against the broad faces. This eventually erodes the edges of the end walls such that the thickness of the cast steel slab is reduced. That is, the distance between broad faces is reduced due to a gradual wearing away of the edges of the end walls.

A number of techniques have been proposed for resurfacing these worn edges in order to build up the eroded end wall surfaces. None, however, has proven to be entirely satisfactory from both a technical and economic standpoint. One such approach is known as fusion welding. The high thermoconductivity of the copper end walls and the tendency of copper to form a porous weld bead make fusion welding a less than satisfactory approach for reclaiming the edges of end walls in continuous casting molds. In addition, it has been found that fusion welding significantly degrades the wear resistance of the mold edge such that the repaired edge has a much shorter service life than the original material. Although fusion welding has been utilized with such materials as chrome-zirconium copper alloys, the resultant surfaces are susceptible to cracking and porosity and exhibit low hardness values.

Another approach which has been utilized in the past to repair worn down end wall edges is electroplating. Electroplating, however, is a very slow and expensive process when used to cover large surface areas such as those present on continuous casting mold end walls with a relatively thick deposit. It is also known that electroplated surfaces may lack the required uniformity and bond strength for mold end wall repair. Similarly, resistance welding and flash welding are not particularly well-suited for forming a layer of new material over a large surface area as required in the present invention.

In the past a welding technique referred to as "explosion welding" has been used to form metal laminates and the like. For example, two or more metallic plates to be bonded together may be placed on top of one another with an intervening space. A layer of explosive is applied to the upper metal sheet which can be detonated by means of a suitable primer. Through the shock wave of the detonation, the upper sheet is accelerated toward the lower sheet. Upon impingement, welding occurs. Examples of explosion cladding are shown in various patents such as U.S. Pat. No. 4,844,321 "Method for Explosive Cladding;" U.S. Pat. No. 3,238,071 "Process of Treating Explosively Clad Metals;" and U.S. Pat. No. 3,900,147 "Method of Cladding Metal Articles." To the applicant's knowledge, however, none of the prior art discloses or suggests the possibility of using explosive cladding techniques for the manufacture or repair of continuous casting mold surfaces.

Therefore, it is an object of the present invention to provide a continuous casting mold having hot face surfaces which are highly resistant to thermal and other degradation.

It is a further object to provide a method of manufacturing or repairing the hot face surfaces of continuous casting molds which provides superior wear-resistant characteristics.

Another object of the present invention is to provide a method for repairing worn down edges of continuous casting mold end walls in a manner which provides high wear resistance of the repaired surfaces equal to or better than that of the original end wall material.

It is a further object of the present invention to provide a method for applying a coating to continuous casting molds by which deformation of the mold section is avoided.

It is still a further object of the present invention to provide a method by which two matched end walls of continuous casting molds can be simultaneously repaired.

SUMMARY OF THE INVENTION

In one aspect, the present invention provides a continuous casting mold having one or more surfaces formed by explosion cladding. The explosion cladded surface may be formed in the original manufacture of the continuous cladding mold or may be formed as a repair of worn surfaces of the mold. It is contemplated that the present invention may also be performed as a mold modification in the nature of a retrofit.

In one aspect, the broad or narrow mold walls are mounted within a retaining structure such that the hot faces are exposed for cladding. A cladding sheet having the dimensions of the region of the surface to be cladded is provided. An explosive charge is mounted behind the cladding sheet such that the sheet is positioned between the charge and the mold face to be cladded. The explosive charge is detonated, causing the cladding sheet to strike the mold surface and bonded to the surface with exceptional bond strength. In this manner, materials which are difficult to bond together using conventional techniques, can be applied to the hot faces of continuous casting molds.

In another aspect, the present invention provides a method for repairing the edges of end walls of a continuous casting mold which have become worn by repeated adjustment of the end wall spacing. A strip of cladding material is placed a predetermined distance from the edge of the end wall to be repaired. An explosive charge is placed adjacent to the cladding strip such that the cladding strip is positioned between the charge and the worn end wall surface. The explosive charge is then detonated, whereupon the cladding strip impinges upon the end wall edge to form a securely bonded, explosion cladded surface of substantially uniform thickness. In one aspect, the edge of the end wall to be repaired and the cladding strip are both made of copper or a copper alloy and, in another, dissimilar materials are bonded together. The present invention also provides a method by which both opposed worn edges of the end walls are simultaneously repaired by explosion cladding.

In still another aspect, the present invention provides a method for repairing two end walls at the same time. The two end walls are aligned such that the worn edges on opposite sides of the walls form a coplanar pair of edges, with one coplanar pair being disposed at each side of the aligned end walls. The end walls are held together and supported by a network of steel plates and bars. A pair of cladding strips are placed at each coplanar surface, symmetrically arranged about the part line of the two end wall edges. An explosive charge is placed adjacent the cladding strips with the cladding strips being disposed between the charge and the end wall surfaces to be repaired. The explosive charges are detonated, resulting in impingement of the cladding strips on the worn edges of the end walls. The brace plates are then removed and the end walls are separated at the part line.

In still another aspect, the present invention provides a method for preventing deformation of the mold section during the explosion cladding process. The method includes filing the internal spaces of the mold section with a supporting material prior to explosion cladding.

These and other features and advantages of the present invention will be more fully described in the detailed description of the preferred embodiments with reference to the drawings in which:

DESCRIPTION OF PREFERRED
EMBODIMENTS OF THE INVENTION

The process of continuous casting a steel slab as well as the construction and operation of continuous casting molds will be understood by those skilled in the art. The method and apparatus of the present invention will now be described in connection with the cladding of broad face section of a continuous casting mold.

Figure 1:
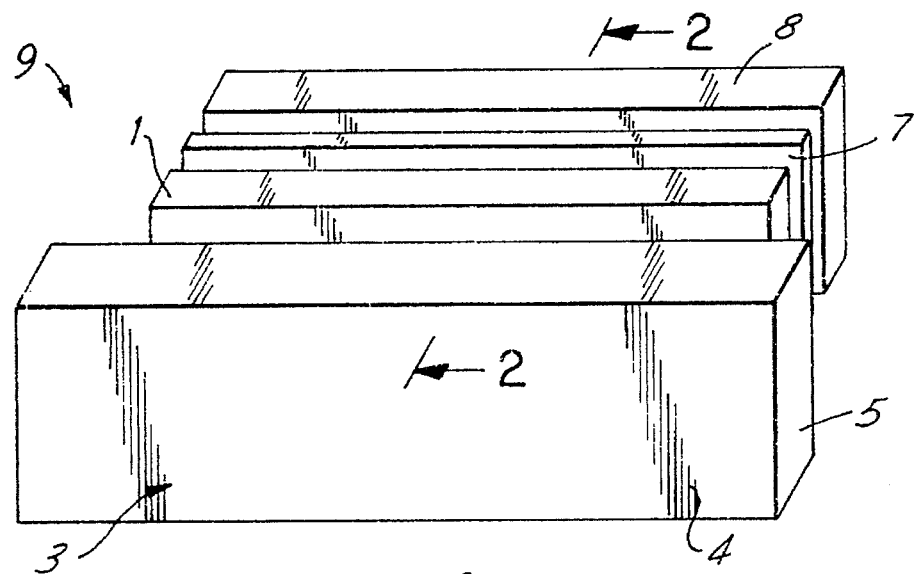
FIG. 1 is a perspective view (exploded) of an explosion cladding assembly for cladding a broad face of a continuous casting mold.
Figure 2:
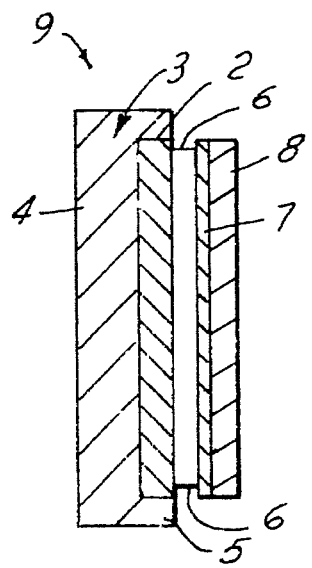
FIG. 2 is a cross-section along lines 2—2 of FIG. 1.

Referring now to FIGS. 1 and 2 of the drawings (not necessarily to scale), broad face wall or section 1 is shown held within a cavity 2 formed in brace or support 3. The function of support 3 is to hold broad face section 1 securely during explosion cladding. A number of support configurations are suitable for use in the present invention. As illustrated in FIGS. 1 and 2, support 3 is shown as a steel plate 4 having side walls 5 which define cavity 2. A plurality of standoffs 6 are provided (not shown in FIG. 1) which support cladding sheet or section 7 to which explosive charge 8 is attached. The nature of the preferred cladding materials and details of charge 8 are described more fully in connection with the description of the end wall repair procedure set forth hereinafter. Most preferably, however, cladding sheet 7 is formed of copper or a copper alloy such as a low silver chromium, zirconium or beryllium copper alloy. A typical thickness for the cladding sheet would be about 0.5 mm–6 mm. Broad face section 1 support 2, standoffs 6 cladding sheet 7 and charge 8 form explosion cladding assembly 9. Any internal cooling channels in section 1 are filled prior to detonation to prevent deformation as described more fully hereinafter. Upon detonation of charge 8, cladding sheet 7 impinges upon the hot face surface of broad face section 1 to form a cladding of a desired thickness. It will be appreciated from the present disclosure that this technique can be used to clad the hot face surfaces (broad or narrow faces) of continuous casting molds during their original manufacture as well as to repair/refurbish worn surfaces of these molds.

Figure 3:
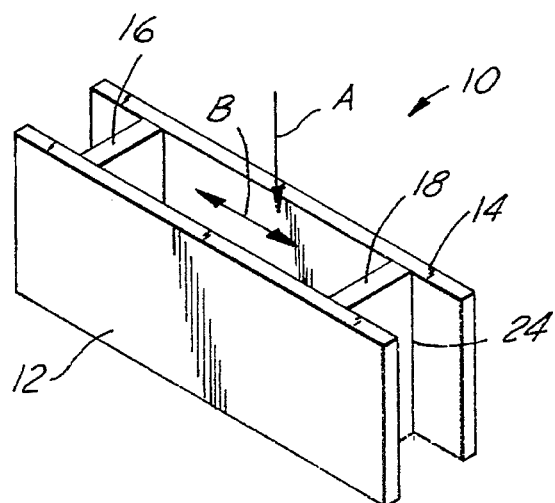
FIG. 3 is a perspective view of a continuous casting mold without attendant clamping and biasing means.

Referring now to FIG. 3, continuous casting mold 10 is shown generally having opposed broad faces or side walls 12 and 14 which are separated by end walls 16 and 18. Surfaces 13 and 15 of broad faces 12 and 14 are shown cladded in accordance with the previous description of the process of the present invention.

Figure 4:
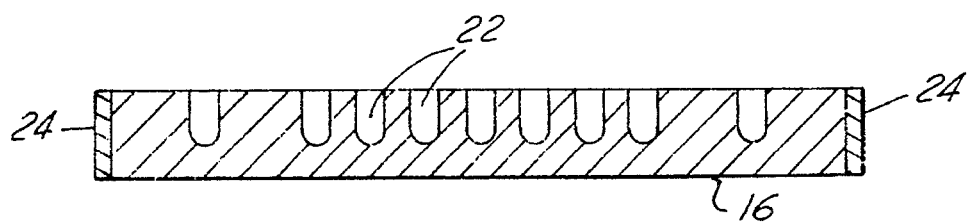
FIG. 4 is a top view of a single end wall with the coolant passages shown in phantom.

Side walls 12 and 14 and end walls 16 and 18 define mold cavity 20 through which molten steel is poured in the direction of arrow A. The outer regions of the molten steel are cooled by the mold surfaces, including surfaces 13 and 15, as the steel passes through the mold cavity. A skin is thereby formed on the molten steel which defines the geometry of the resultant slab. As stated, in order to dissipate the vast amount of heat generated by the molten steel, copper or copper alloys are utilized for extremely high thermal conductivity. In addition to the use of copper to dissipate heat, side walls 12 and 14 and end walls 16 and 18 have an internal network of coolant passages 22, as shown in FIG. 4, through which water is pumped during casting to increase the heat exchange efficiency of mold 10.

Referring again to FIG. 3 of the drawings, in order to change the width of the steel slab during casting, end walls 16 and 18 can be moved along axis B by releasing the clamping force of side walls 12 and 14. (Typically, only a single side wall can be moved, with the other wall being stationary.) Due to the magnitude of the forces exerted on surfaces or edges 24 of end walls 16 and 18 by side walls 12 and 14 as end walls 16 and 18 are moved, edges 24 are rapidly worn down distorted or bruised. This in turn reduces the distance between side walls 12 and 14 producing a corresponding reduction in the width of the steel slab and more importantly, can create an opening in the mold through which the molten steel can leak out. The service life of edges 24 varies depending upon the frequency of end wall adjustment and the characteristics of the metal from which the end walls are formed; however, after edges 24 have significantly degraded the end walls 16 and 18 must be removed and repaired.

Figure 5:
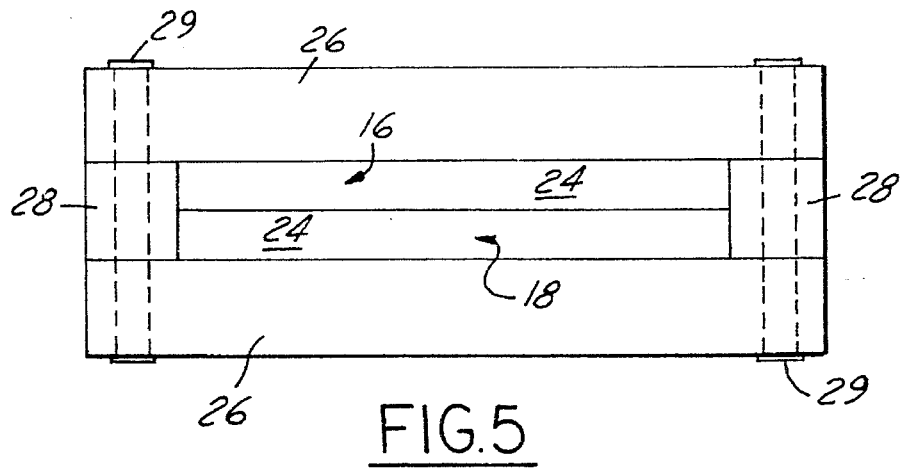
FIG. 5 is an elevational view of two end walls held together by a pair of steel braces and steel bars.
Figure 6:
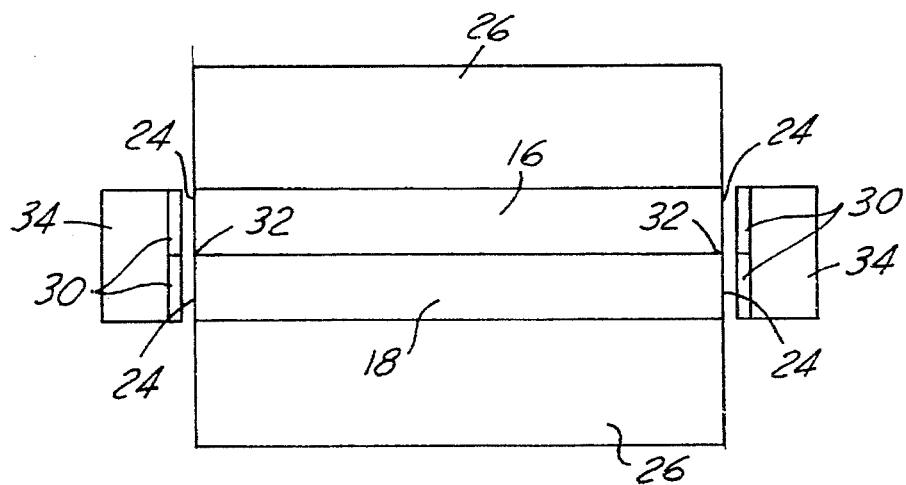
FIG. 6 is a top view of a pair of end walls held together by a pair of steel braces, with the cladding strips and explosive charges also shown.

In one embodiment of the present invention, and referring now to FIGS. 5 and 6 of the drawings, end walls 16 and 18 are removed from mold 20 and placed in longitudinal contacting alignment so that worn edges 24 form a coplanar surface. It is to be understood that in this embodiment of the invention the edge surfaces 24 of two end walls are clad simultaneously, a technique which has been particularly efficient; however, if desired, a single end wall can be treated following the teachings of this disclosure. In order to hold end walls 16 and 18 in place during the cladding process, a series of metal braces or retaining plates 26 and insert blocks or bars 28 are provided which in this particular embodiment are made of steel. In effect, end walls 16 and 18 are sandwiched between plates 26 with lateral movement prevented by bars 28. End walls 16 and 18 are locked into position by bolts 29 which are inserted in matching bores (shown in phantom in FIG. 5) through plates 26 and bars 28 and drawn down sufficiently to firmly hold end walls 16 and 18.

An important feature of the present invention is maintaining the original overall geometry of end walls 16 and 18 and broad walls 12 and 14 throughout the cladding procedure. As stated, end walls 16 and 18 are typically formed of a low to medium-strength copper alloy and are provided with a network of cooling passages 22 shown in FIG. 4, as well as various bores such as stud and thermocouple holes. It is also known that end walls 16 and 18 must maintain close dimensional accuracy for proper casting. The forces required for explosion welding will deform end walls 16 and 18 unless passages 22 are filled in some manner. In accordance with the present invention, passages 22 are filled prior to explosion welding. In one embodiment, passages 22 are filled with a molten metal such as Bismuth, Tin or a combination that has a relatively low melting point which is substantially less than that of the end wall material. The molten metal is poured into passages 22 (and any other bores or the like). Following the cladding procedure, the filler material is removed from passages 22 by heating end walls 16 and 18 to the melting point of the filler and extracting the molten filler. Alternatively, preformed metal inserts (not shown) such as steel can be made which are then inserted into sections of passages 22 to prevent deformation of ends walls 16 and 18. Most preferably, a combination of molten filler and preformed metal inserts are utilized.

Figure 7:
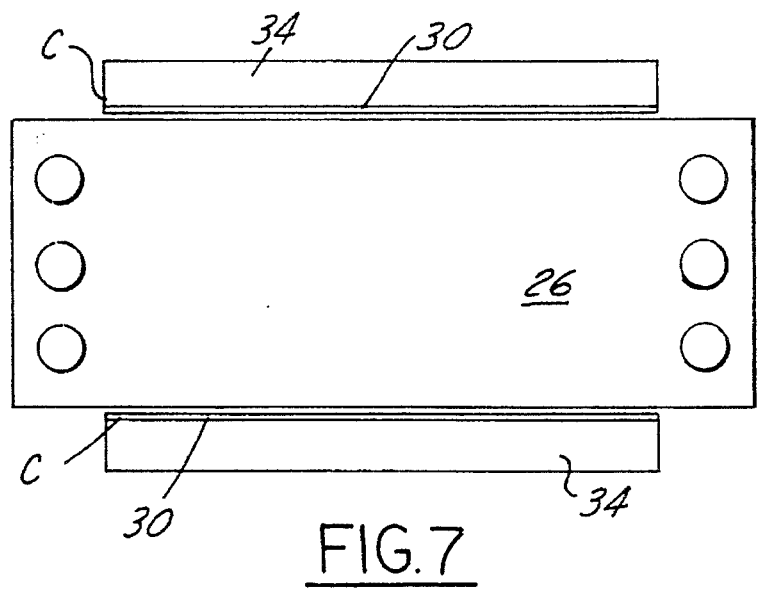
FIG. 7 is a side view of the assembly of the present invention prior to explosion cladding, illustrating the steel plate, cladding strips and explosive charges.

Referring now to FIG. 6 of the drawings (in which one of bars 28 has been removed to illustrate the position of end walls 16 and 18), a pair of cladding strips 30 are provided at the aligned edges 24 of end walls 16 and 18. As shown best in FIG. 7, cladding strips 30 are linear in nature and are coextensive with the length of each edge 24. In that embodiment of the present invention in which two end walls are clad simultaneously, cladding strips 30 are positioned on each side of the intersection or part line 32 of end walls 16 and 18. By aligning cladding strips 30 symmetrically about part line 32, the explosion cladding process does not significantly weld the two end walls together.

Cladding strips 30 are shown positioned in contact with and affixed to the explosive charges 34 with strips 30 spaced a predetermined distance from surfaces 24. A number of support systems can be utilized to maintain the required standoff distance. They are normally an inexpensive, expendable materials such as wood or plastic and must be positioned at spaced locations along the extreme outermost edges of the cladding strip 30 such that they are expelled from the weld interface and do not interfere in any manner with the weld completeness or quality. Alternatively, they may be included as a part of the explosive container system which is also expendable. This applies equally to the cladding of the broad and narrow wall hot faces, wherein standoffs 6 are illustrated.

As will be appreciated by those skilled in the art of explosion cladding, a detonator (not shown) is attached to each explosive charge 34. In the present invention charges 34 are detonated such that ignition of the charge begins at one end of cladding strip 30 indicated at point C in FIG. 7. In this manner the shock wave and pressure pulse produced by the explosion propagates down the length of cladding strip 30 at a controlled rate to accelerate and weld cladding strips 30 to edges 24 through a high-pressure collision. In one embodiment of the present invention, charges 34 are detonated simultaneously so that both edges of each end wall 16 and 18 are simultaneously clad. This requires coordination and balance of the explosive and welding forces.

The amount of explosive which is utilized is a function of a number of factors such as the nature of the cladding material, the thickness of the cladding material, and the composition of the cladding material. For most applications, however, a typical predominately ammonium nitrate based explosive (incorporating a few percent of an appropriate fuel or sensitizer and density control agent) having a detonation velocity in the range of 2000 to 3200M per second will be appropriate. This material is typically granular or powder-like and can be formed in a wood or cardboard container or the like. Where the surface area of each edge 24 is from about 200 to 400 $cm^2$ and where two edges are arranged in a single plane as described herein, from about 2 to about 9 kilograms of explosive will be suitable for most applications. An appropriate detonator for use will be a length of high velocity detonating cord or strip which is secured to each charge 34 coextensive therewith. The explosive content or strength equivalent of the detonating cord will typically be from about 25 to 50 grains of PETN per foot of length and a velocity of detonation typically between 6000 and 7000M per second.

The thickness of the cladding strips used in the present invention will depend upon the desired thickness of the resultant coating and should have a uniform thickness. For many applications the cladding strips will be from about 1 to about 10 millimeters in thickness.

A number of metals can be used for the cladding strips. Most preferred for use herein are copper and copper alloys such as low silver alloy (C107) or chrome-zirconium or beryllium-copper matched to the original alloy of the face being repaired. The present invention, however, is also particularly suited for cladding strips of a material which is different from that of the original face material and may include other copper alloys as well as nickel and cobalt base alloys which will provide superior wear resistance.

As charges 34 are detonated (simultaneously), they initiate a shock wave which causes cladding strips 30 to impinge upon edges 24 with sufficient force to bond securely to end walls 16 and 18, thereby forming a new wear resistant surface over the entire width and length of edges 24. The various braces and the like as well as the coolant passage filler are then removed. End walls 16 and 18 are separated, newly-formed edges 24 are machined to the appropriate finish, and the mold is reassembled.

EXAMPLES

Thus, it is apparent that there has been provided in accordance with the invention a method that fully satisfies the objects, aims and advantages set forth above. While the invention has been described in connection with specific embodiments thereof, it is evident that many alternatives, modifications, and variations will be apparent to those skilled in the art in light of the foregoing description. Accordingly, it is intended to embrace all such alternatives, modifications and variations that fall within the spirit and broad scope of the appended claims.

EXAMPLE 1

As an example, a pair of chrome-zirconium alloy narrow faces were edge clad by the procedure described herein as follows:

1) The worn edges were machined to produce matched, flat edges for cladding when fitted together in the steel supporting fixture.

2) All internal channeling and recessed area on the back surface of the narrow faces were filled with a combination of steel and low melting alloy for dimensional support during the explosion welding operation.

3) The mated pair of plates were then encased in the surrounding and matching plain carbon steel external support structure with 2-inch thick side support plates.

4) Wooden containers were fabricated to hold the explosive and the matching 10 mm thick by 25 mm wide chrome-zirconium alloy copper cladding strips attached as an integral part of the container such that the explosive would be directly coupled to their outer surface when positioned on the assembly for cladding.

5) The containers were loaded with a nominally 9 cm thick layer of ammonium nitrate base explosive having a total approximate weight of 9 kilograms and formulated to have a detonation velocity in the range of 2300 to 2600M per second.

6) The loaded explosive/cladding strip assemblies were then positioned over the encased narrow face assembly at a nominal standoff distance of 8 mm and the explosive charges simultaneously detonated to clad the strips onto the entire exposed edge surfaces of the narrow faces.

7) Following the explosion welding operation, the external steel support bars were removed and the two narrow faces separated to expose and remove the internal support tooling materials.

8) The clad edges of the narrow faces were then machined to the desired final thickness and the matching width of the narrow faces as the final step of the repair procedure.

What is claimed is:

1. A method of applying a metal or metal alloy coating to the surfaces of a continuous casting mold, comprising the steps of:

providing at least one section of a continuous casting mold, said one section having a planar surface to be cladded and a back surface having a plurality of open coolant channels;

positioning a cladding material adjacent said planar surface of said section, said cladding material including a metal or metal alloy which is bondable to said surface;

placing an explosive charge adjacent said cladding material such that said cladding material is disposed between said explosive charge and said planar surface; and detonating said explosive charge such that said cladding material is bonded to said planar surface by the action of said explosion.

2. The method recited in claim 1, wherein said surface is a worn planar surface and wherein said method is the build up repair of said worn surface.

3. The method recited in claim 1, wherein the thickness of said cladding material after bonding to said planar surface is from about 1 mm to about 10 mm.

4. The method recited in claim 1, wherein said section is a broad wall or narrow wall of said continuous casting mold and said planar surface is the hot face surface of said wall.

5. The method recited in claim 4, wherein said cladding material is a metal selected from the group consisting of copper and copper alloys.

6. The method recited in claim 1, further including the step of providing solid inserts shaped to correspond and mate with said open coolant channels;

placing said solid inserts into at least some of said plurality of open coolant channels prior to said detonation step to prevent said channels from deforming during said detonating step; and removing said solid insert after said detonating step.

7. The invention recited in claim 6, wherein said solid inserts are formed of steel.

8. The method recited in claim 6, further including the step of filling at least some of said open coolant channels with a low melting point metal by pouring said metal in a molten state into said open coolant channels prior to said detonation step, and removing said low melting point metal from said open channels after said detonation step.

9. A method of applying a metal or a metal alloy coating to two walls of a continuous casting mold, comprising the steps of:

providing two walls of a continuous casting mold having surfaces to be clad;

placing said walls in side-by-side contacting alignment with said surfaces to be clad forming a coplanar area;

positioning a pair of cladding strips adjacent said coplanar area;

placing an explosive charge adjacent said pair of cladding strips such that said cladding strips are disposed between said explosive charge and said coplanar area; and detonating said explosive charge such that the cladding strips are bonded to said surfaces of said walls.

10. The method recited in claim 8, wherein said coplanar area has a part line and wherein said cladding strips are positioned on each side of said part line such that one cladding strip bonds to one of said surfaces and the other cladding strip bonds to the other of said surfaces without substantially bonding said walls together.

11. The method recited in claim 8, further comprising the step of bracing both of said walls together in said side-by-side contacting alignment.

12. The method recited in claim 8, wherein said walls are end walls.

13. The method recited in claim 8, wherein said walls are broad faces.

14. The invention recited in claim 8, wherein each of said walls has two opposite surfaces and wherein said opposite surfaces are simultaneously clad as coplanar areas.

15. The method recited is claim 8, wherein said walls each define at least one internal space and further including the steps of filling said internal space with a filler such that said walls do not deform in response to said explosion.

16. The method recited in claim 15, wherein said filler is a preformed solid structure which is inserted into said internal space.

17. The method recited in claim 15, wherein said filler includes a molten metal having a melting point which is substantially less than that of the material from which said walls are formed and including the steps of solidifying said molten metal in said internal spaces prior to said detonation step, melting said solidified metal in said internal spaces after said detonation step and removing substantially all of said molten metal from said internal spaces.

* * * * *